US010303022B2

(12) United States Patent
Yen et al.

(10) Patent No.: US 10,303,022 B2
(45) Date of Patent: May 28, 2019

(54) DISPLAY PANEL

(71) Applicant: Innolux Corporation, Miao-Li County (TW)

(72) Inventors: Chung-Wen Yen, Chu-Nan (TW); Te-Yu Lee, Chu-Nan (TW); Chien-Ta Huang, Chu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/628,312

(22) Filed: Jun. 20, 2017

(65) Prior Publication Data

US 2017/0285426 A1 Oct. 5, 2017

Related U.S. Application Data

(63) Continuation of application No. 14/750,522, filed on Jun. 25, 2015, now Pat. No. 9,720,296.

(30) Foreign Application Priority Data

Feb. 12, 2015 (TW) .............................. 104104685 A

(51) Int. Cl.
*G02F 1/1362* (2006.01)
*G02F 1/1343* (2006.01)

(52) U.S. Cl.
CPC .. *G02F 1/136227* (2013.01); *G02F 1/134309* (2013.01); *G02F 2001/134372* (2013.01)

(58) Field of Classification Search
CPC ................................................ G02F 1/136227
See application file for complete search history.

(56) References Cited

U.S. PATENT DOCUMENTS

| 2008/0007679 A1* | 1/2008 | Ochiai ............. G02F 1/134363 349/114 |
| 2009/0190081 A1* | 7/2009 | Kim .................. G02F 1/133707 349/139 |
| 2009/0195489 A1* | 8/2009 | Hung ................ G02F 1/136286 345/92 |

(Continued)

FOREIGN PATENT DOCUMENTS

| CN | 102566162 A | 7/2012 |
| CN | 104246593 A | 12/2014 |

(Continued)

OTHER PUBLICATIONS

Chinese Office Action dated Sep. 3, 2018.

*Primary Examiner* — Sang V Nguyen
(74) *Attorney, Agent, or Firm* — Rabin & Berdo, P.C.

(57) ABSTRACT

A display panel is provided. The display panel includes a first substrate, a first insulating layer, a common electrode, a second insulating layer, a first pixel electrode, and a second pixel electrode. The first insulating layer is located on the first substrate. The common electrode having a first through hole is located on the first insulating layer. The second insulating layer covers the common electrode and partially covers the first through hole. The first pixel electrode is located on the second insulating layer and penetrates through the first through hole. The second pixel electrode is located on the second insulating layer. The second pixel electrode is adjacent to the first pixel electrode and overlaps a portion of the first through hole.

16 Claims, 7 Drawing Sheets

(56) References Cited

U.S. PATENT DOCUMENTS

| | | | |
|---|---|---|---|
| 2009/0207364 A1 | 8/2009 | Morimoto et al. | |
| 2012/0019747 A1* | 1/2012 | Nakayoshi | G02F 1/136213 349/106 |
| 2013/0299830 A1* | 11/2013 | Ishigaki | H01L 33/08 257/59 |
| 2014/0168537 A1* | 6/2014 | Han | G06F 3/0412 349/12 |
| 2014/0347589 A1* | 11/2014 | Kim | G02F 1/136286 349/43 |
| 2015/0085215 A1* | 3/2015 | Yoshida | G02F 1/136213 349/39 |
| 2015/0160521 A1* | 6/2015 | Tomioka | G02F 1/133707 349/110 |
| 2015/0200206 A1* | 7/2015 | Liu | G02F 1/136286 257/72 |
| 2016/0187695 A1* | 6/2016 | Cho | G02F 1/13338 349/12 |

FOREIGN PATENT DOCUMENTS

| | | | | |
|---|---|---|---|---|
| KR | 20070078389 A | | 7/2007 | |
| KR | 10-2014-0195980 | * | 12/2014 | G02F 1/1362 |
| KR | 20140138472 A | | 12/2014 | |
| KR | 1020140195980 | * | 12/2014 | G02F 1/1333 |

* cited by examiner

DISPLAY PANEL

This application is a continuation application of co-pending application Ser. No. 14/750,522, filed on Jun. 25, 2015, which claims the benefit of Taiwan application Serial No. 104104685, filed Feb. 12, 2015, the contents of which are incorporated herein by reference.

BACKGROUND OF THE INVENTION

Field of the Invention

The present disclosure is related in general to a display panel, and particularly to a display panel having high resolution.

Description of the Related Art

Liquid crystal displays have been widely applied in a variety of electronic products, such as cell phones, laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

In addition, liquid crystal displays having high resolution have become the existing trends. However, along with the introduction of high resolution technology, new issues arise as well affecting the display qualities. Therefore, researchers have been working on providing liquid crystal display panels having high resolution.

SUMMARY OF THE INVENTION

The present disclosure is directed to a display panel. In the display panels of the embodiments, the second pixel electrode is adjacent to the first pixel electrode and overlaps a portion of the first through hole of the common electrode; as such, the distance between pixel electrodes can be effectively reduced, more pixel electrodes can be disposed in a unit area, and accordingly the pixel per inch (ppi) of the display panel can be effectively increased.

According to an embodiment of the present disclosure, a display panel is provided. The display panel includes a first substrate, a first insulating layer, a common electrode, a second insulating layer, a first pixel electrode, and a second pixel electrode. The first insulating layer is located on the first substrate. The common electrode having a first through hole is located on the first insulating layer. The second insulating layer covers the common electrode and partially covers the first through hole. The first pixel electrode is located on the second insulating layer and penetrates through the first through hole. The second pixel electrode is located on the second insulating layer. The second pixel electrode is adjacent to the first pixel electrode and overlaps a portion of the first through hole.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
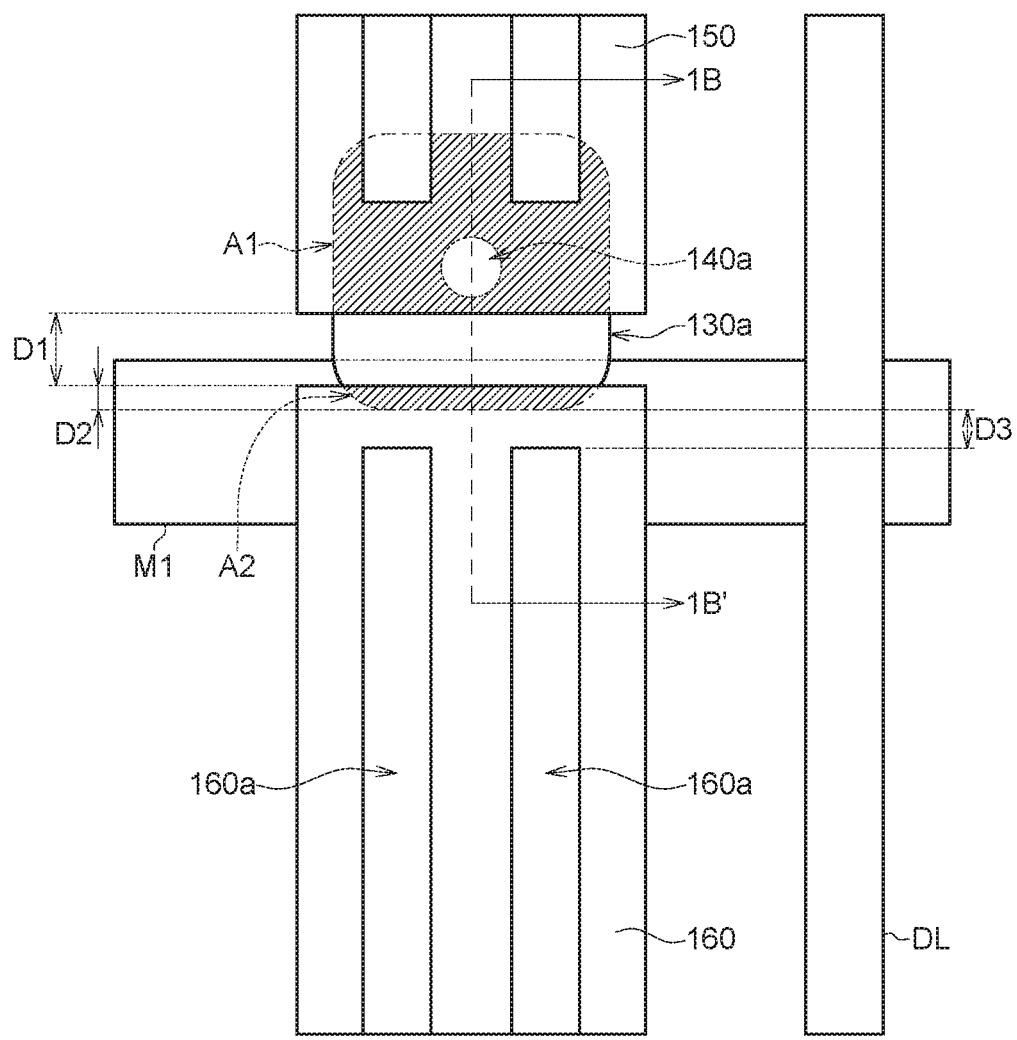
FIG. 1A shows a top view of a display panel according to an embodiment of the present disclosure.

According to the embodiments of the present disclosure, a display panel is provided. In the embodiments, the second pixel electrode is adjacent to the first pixel electrode and overlaps a portion of the first through hole of the common electrode; as such, the distance between pixel electrodes can be effectively reduced, more pixel electrodes can be disposed in a unit area, and accordingly the pixel per inch (ppi) of the display panel can be effectively increased. The embodiments are described in details with reference to the accompanying drawings. However, the embodiments are for exemplification only, not for limiting the scope of protection of the disclosure. Besides, some of the secondary elements are omitted in the drawings accompanying the following embodiments to highlight the technical features of the invention.

Figure 1B:
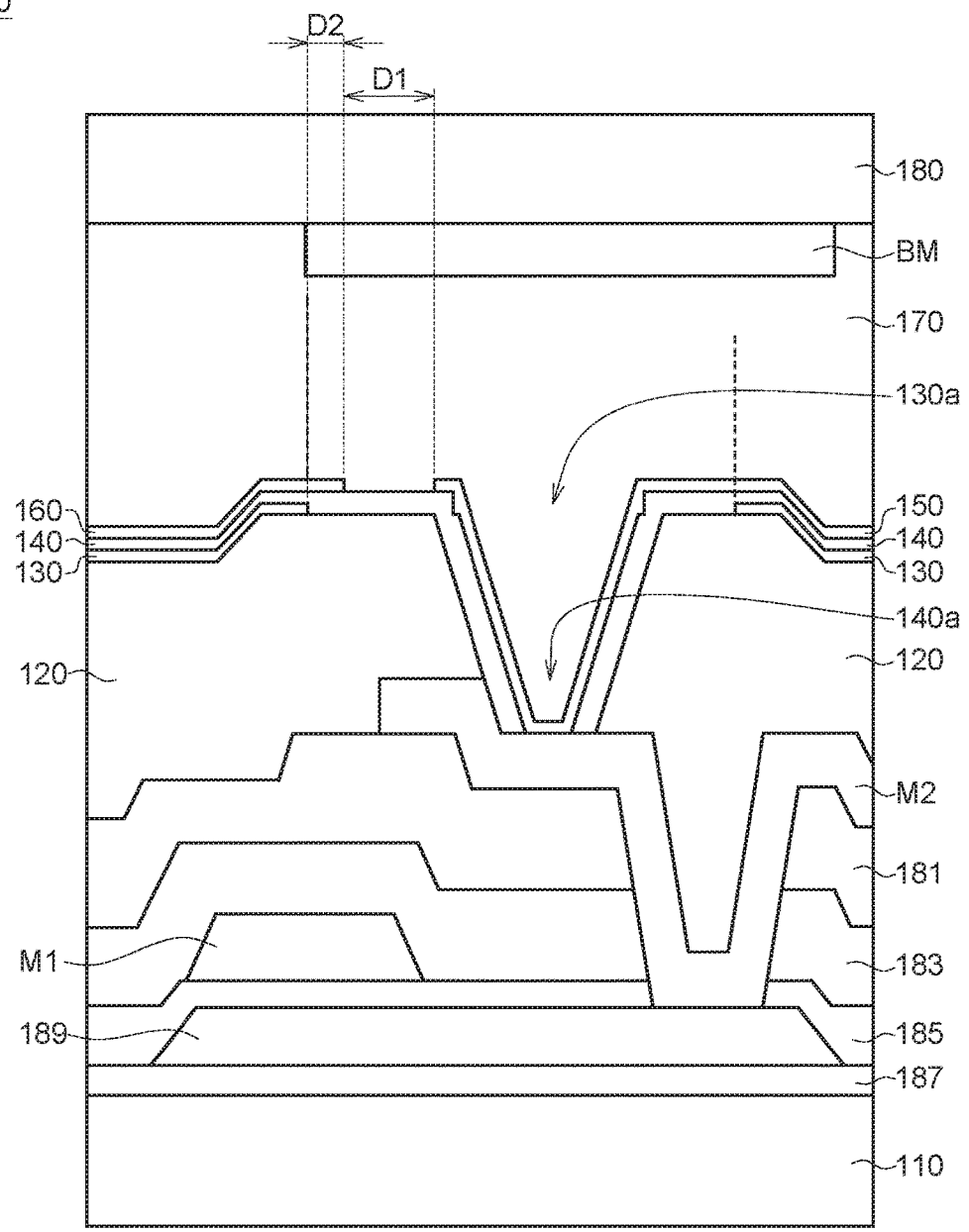
FIG. 1B shows a cross-sectional view along the cross-sectional line 1B-1B' of FIG. 1A.

FIG. 1A shows a partial top view of a display panel 100 according to an embodiment of the present disclosure, and FIG. 1B shows a cross-sectional view along the cross-sectional line 1B-1B' of FIG. 1A. As shown in FIGS. 1A-1B, the display panel 100 includes a first substrate 110, a first insulating layer 120, a common electrode 130, a second insulating layer 140, a first pixel electrode 150, and a second pixel electrode 160. The first insulating layer 120 is located on the first substrate 110. The common electrode 130 is located on the first insulating layer 120, and the common electrode 130 has a first through hole 130a. The first pixel electrode 150 is located on the second insulating layer 140, and the first pixel electrode 150 penetrates through the first through hole 130a. The second pixel electrode 160 is located on the second insulating layer 140, and the second pixel electrode 160 is adjacent to the first pixel electrode 150. The second pixel electrode 160 overlaps a portion of the first through hole 130a.

According to the embodiments of the present disclosure, the second pixel electrode 160 is adjacent to the first pixel electrode 150, and the second pixel electrode 160 overlaps a portion of the first through hole 130a. As such, the distance between the pixel electrodes can be effectively reduced, and thus more pixel electrodes can be disposed in a unit area; that is, more pixel units can be disposed in a unit area. Accordingly the pixel per inch (ppi) of the display panel 100 can be effectively increased.

In the embodiment, the common electrode 130 fully covers the structure below the first insulating layer 120 in one pixel unit, and the structure below the common electrode 130 is exposed only from the first through hole 130a.

In the embodiment, the first substrate 110 is such as a glass substrate or a plastic substrate, and the first insulating layer 120 includes such as an organic insulating material. The common electrode 130, the first pixel electrode 150, and the second pixel electrode 160 can respectively include a transparent conductive material, such as ITO.

In the embodiment, as shown in FIGS. 1A-1B, the first pixel electrode 150 and the second pixel electrode 160 are separated by a first distance D1, the second pixel electrode 160 extends toward the first through hole 130a by a second distance D2, and the first distance D1 is such as larger than the second distance D2.

Due the current trend of gradually increasing the ppi of display panels, the sizes of pixel units are reduced, resulting in the reduction of the overlapping area of a pixel electrode and a common electrode, and thus issues of reduction of storage capacitance arise. According to the embodiments of the present disclosure, as shown in FIG. 1B, the second pixel electrode 160 extends toward the inside of the first through hole 130a by a second distance D2. In other words, the second pixel electrode 160 fully covers the common electrode 130. In addition, as shown in FIG. 1B, the first pixel electrode 150 fully covers the common electrode 130 as well. According to the design of the first pixel electrode 150/the second pixel electrode 160 and the common electrode 130 of the present disclosure, the overlapping area of the common electrode 130 and the first pixel electrode 150/the second pixel electrode 160 can be maximized with the second insulating layer 140 disposed there between, such that the overlapping area of the pixel electrodes and the common electrodes can be effectively increased, and the ppi of the display panel, as well as the storage capacitance, can be further increased.

In addition, according to the embodiments of the present disclosure, the second pixel electrode 160 extends toward the first through hole 130a by a second distance D2; that is, the second pixel electrode 160 extends and goes beyond the common electrode 130 for covering a portion of the first through hole 130a. As such, the shift of the position of the second pixel electrode 160 with respect to the position of the common electrode 130 due errors in the manufacturing processes can be effectively prevented. In other words, the second pixel electrode 170 extending and going beyond the edge of the common electrode 130 can provide a buffer for the manufacturing processes, such that the manufactured product may be provided with a structure in which the overlapping area of the common electrode 130 and the first pixel electrode 150/the second pixel electrode 160 can be maximized.

In the embodiment, the first distance D1 is such as 2.0-5.0 μm, and the second distance D2 is such as 0.1-1.0 μm.

As shown in FIG. 1A, in the embodiment, the second pixel electrode 160 may have a slit 160a, the slit 160a and the first through hole 130a are separated by a third distance D3, and the third distance D3 is such as larger than the second distance D2.

In the embodiment, the third distance is such as 2.0-5.0 μm.

As shown in FIG. 1A, in the embodiment, a first area A1 defined by the overlapping area of the first pixel electrode 150 and the first through hole 130a is such as larger than a second area A2 defined by the overlapping area of the second pixel electrode 160 and the first through hole 130a.

In the embodiment, the display panel 100 may further include a scan line M1. As shown in FIGS. 1A-1B, in the present embodiment, the scan line M1 overlaps with such as a portion of the second pixel electrode 160.

As shown in FIG. 1A, in the embodiment, the second insulating layer 140 has a second through hole 140a, and the second through hole 140a is located within the first through hole 130a. The second through hole 140a is such as smaller than the first through hole 130a.

In the embodiment, as shown in FIG. 1B, the display panel 100 may further include a metal layer M2. The first pixel electrode 150 is electrically connected to the metal layer M2 through the second through hole 140a.

In the embodiment, the first pixel electrode 150 may be electrically connected to the drain/source through the metal layer M2.

In the embodiment, as shown in FIG. 1A, the display panel 100 may further include a data line DL. The metal line M2 may be electrically connected to the data line DL. In other words, the first pixel electrode 150 may be electrically connected to the metal line M2, for further electrically connecting to the data line DL, through the second through hole 140a.

In the embodiment, as shown in FIG. 1B, the display panel 100 may further include a second substrate 180 and a liquid crystal layer 170. The first substrate 110 is assembled to the second substrate 180, and the liquid crystal layer 170 is located between the first substrate 110 and the second substrate 180. In the embodiment, the second substrate 180 is such as a color filter substrate.

In the embodiment, as shown in FIG. 1B, the display panel 100 may further include a black matrix BM. The black matrix BM is located on the second substrate 180 and corresponding to the first through hole 130a of the common electrode 130. In other embodiments, the black matrix BM may be on the first substrate 110 as well for realizing the black matrix on array (BOA) structure.

In the embodiment, as shown in FIG. 1B, the display panel 100 may further include insulating layers 181, 183, 185, and 187 and a semiconductor layer 189. The scan line M1 is located on the insulating layer 185, and the semiconductor layer 189 is located on the insulating layer 187. The insulating layers 181, 183, 185, and 187 may respectively include, for example, silicon nitride, silicon oxide, or the combination thereof. The semiconductor layer 189 may include, for example, indium gallium zinc oxide (IGZO), low-temperature polysilicon (LTPS), or amorphous silicon.

According to the embodiments of the present disclosure, the common electrode 130, the first pixel electrode 150, and the second pixel electrode 160 are all located on the same side of the liquid crystal layer 170, and the common electrode 130 is separated from the pixel electrodes 150/160 by the second insulating layer 140. These electrodes are all located on the first substrate 110 where the transistor elements are located. The display panel 100 is such as a fringe field switching (FFS) liquid crystal display panel.

Figure 2A:
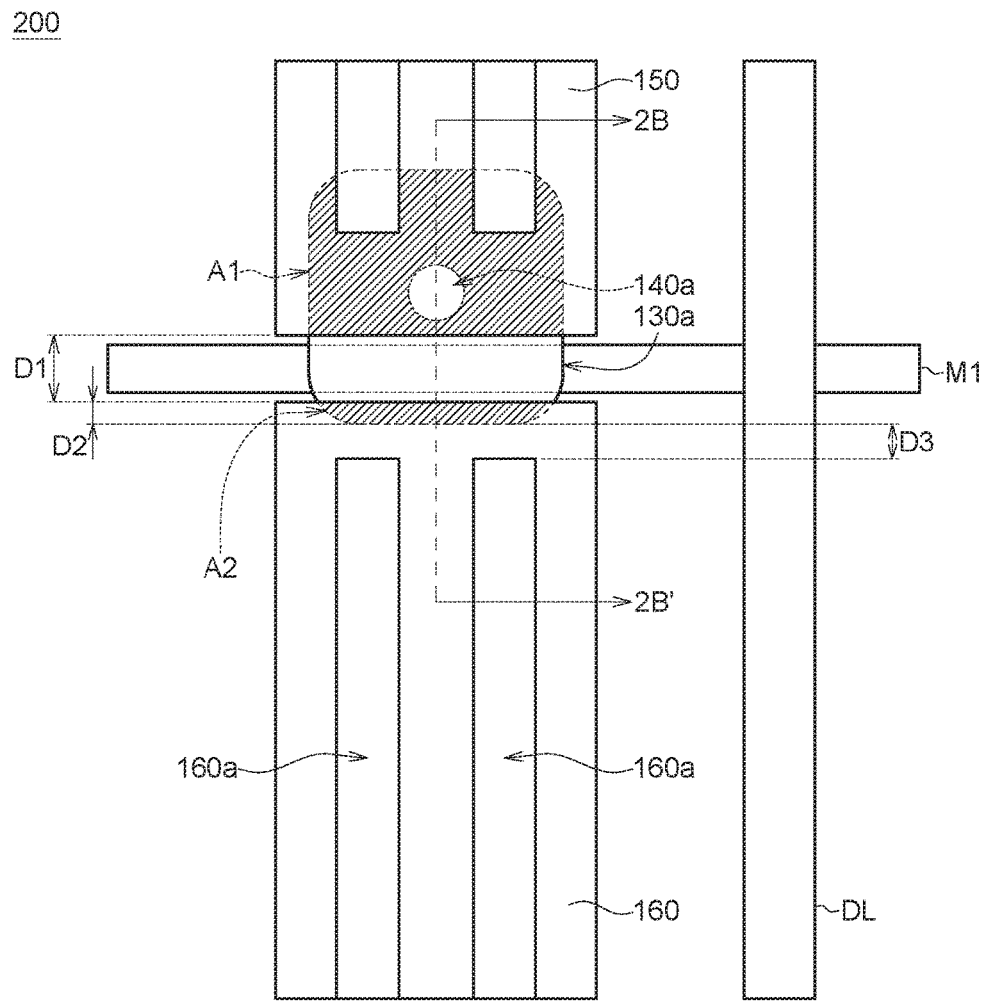
FIG. 2A shows a top view of a display panel according to another embodiment of the present disclosure.
Figure 2B:
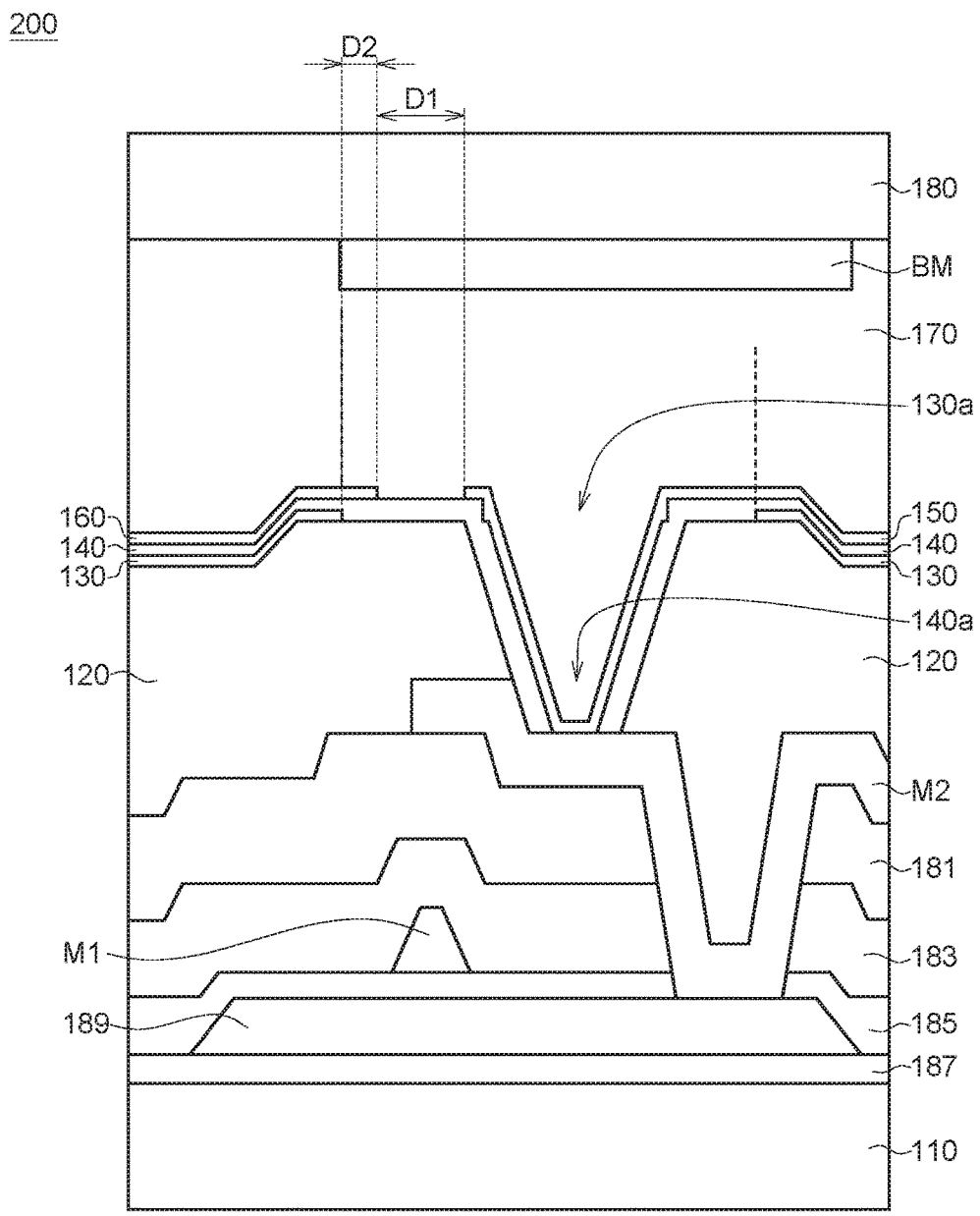
FIG. 2B shows a cross-sectional view along the cross-sectional line 2B-2B' of FIG. 2A.

FIG. 2A shows a top view of a display panel 200 according to another embodiment of the present disclosure, and FIG. 2B shows a cross-sectional view along the cross-sectional line 2B-2B' of FIG. 2A. The elements in the present embodiment sharing the same or similar labels with those in the previous embodiment are the same or similar elements, and the description of which is aforementioned.

As shown in FIGS. 2A-2B, in the present embodiment, the scan line M1 is located such as between the first pixel electrode 150 and the second pixel electrode 160. The scan line M1 does not overlap with any of the first pixel electrode 150 or the second pixel electrode 160.

Figure 3A:
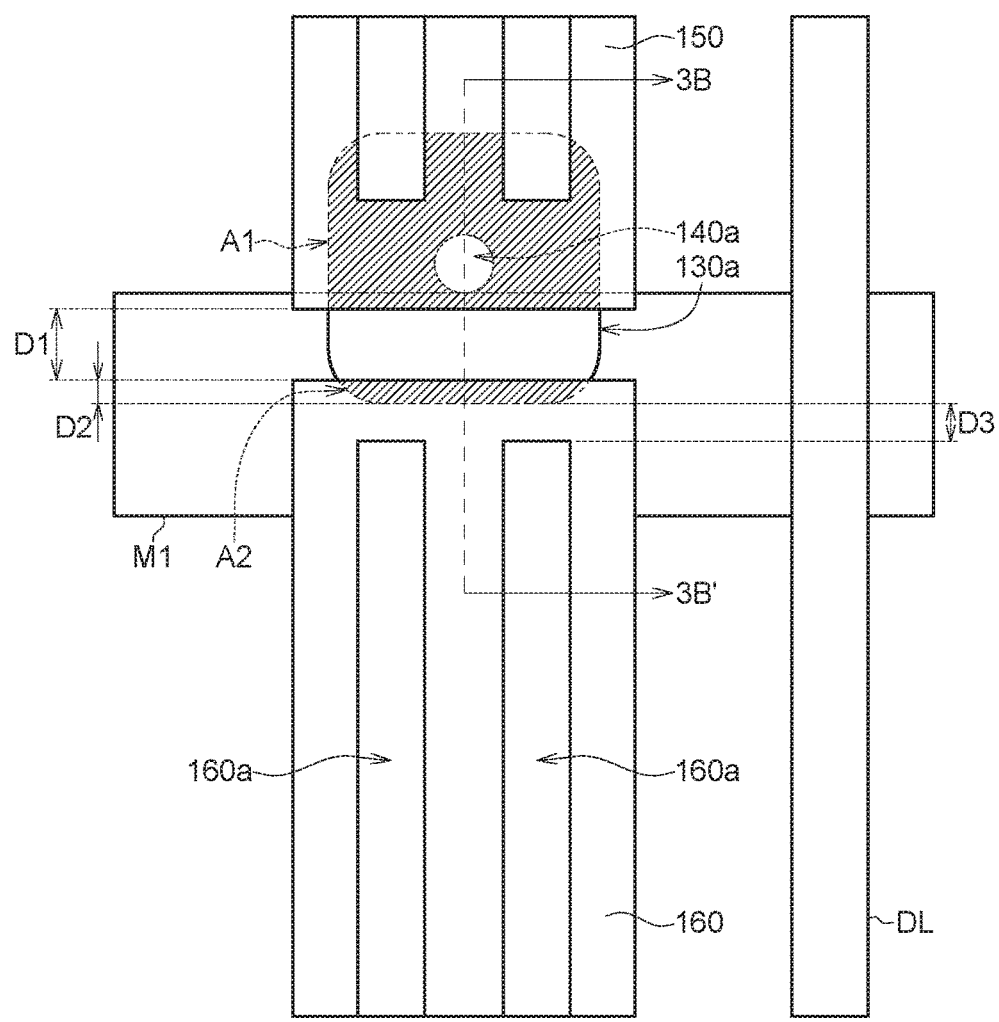
FIG. 3A shows a top view of a display panel according to a further embodiment of the present disclosure.
Figure 3B:
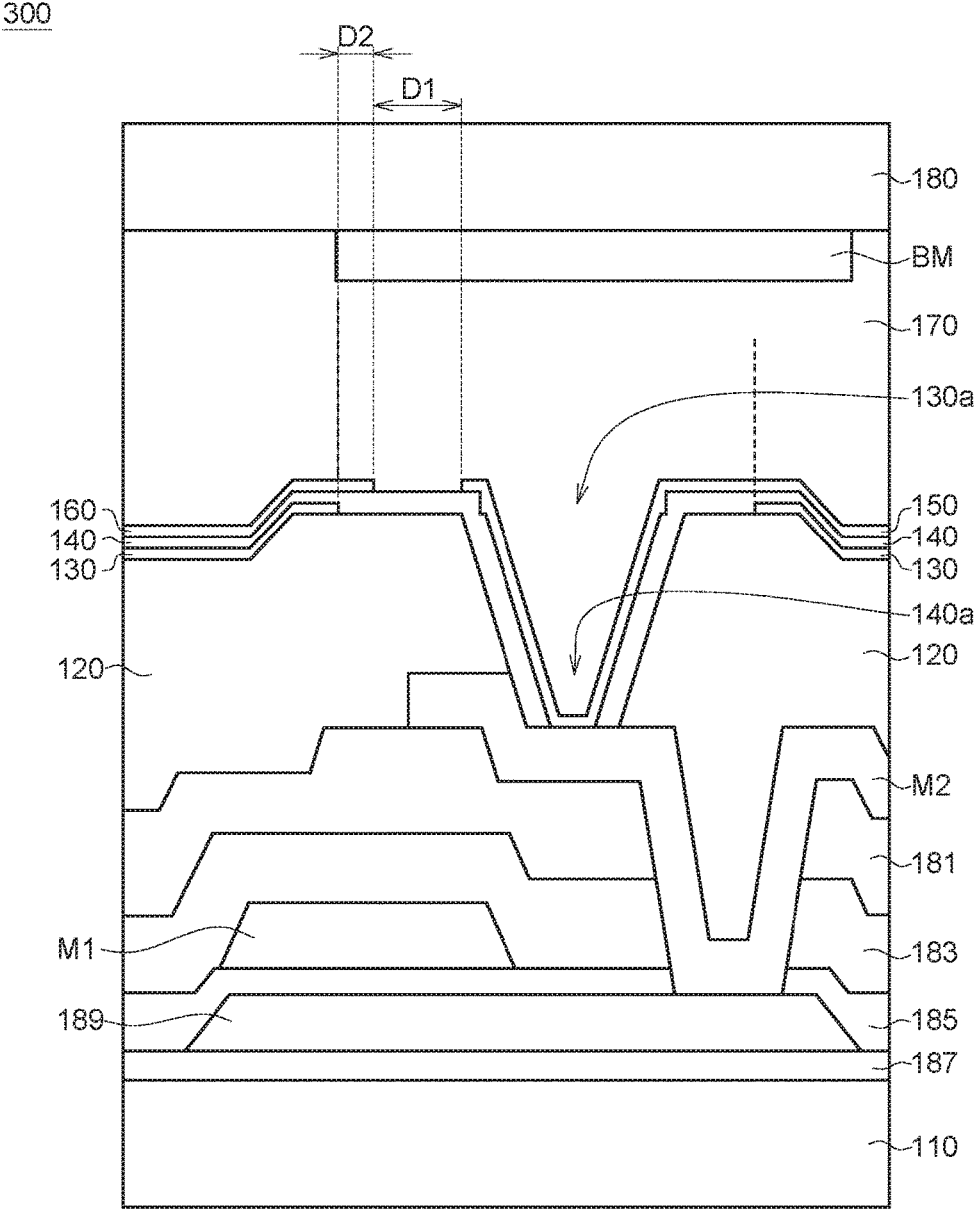
FIG. 3B shows a cross-sectional view along the cross-sectional line 3B-3B' of FIG. 3A.

FIG. 3A shows a top view of a display panel 300 according to a further embodiment of the present disclosure, and FIG. 3B shows a cross-sectional view along the cross-sectional line 3B-3B' of FIG. 3A. The elements in the present embodiment sharing the same or similar labels with those in the previous embodiments are the same or similar elements, and the description of which is aforementioned.

As shown in FIGS. 3A-3B, in the present embodiment, the scan line M1 of the display panel 300 may overlap with a portion of the first pixel electrode 150 and a portion of the second pixel electrode 160.

Figure 4:
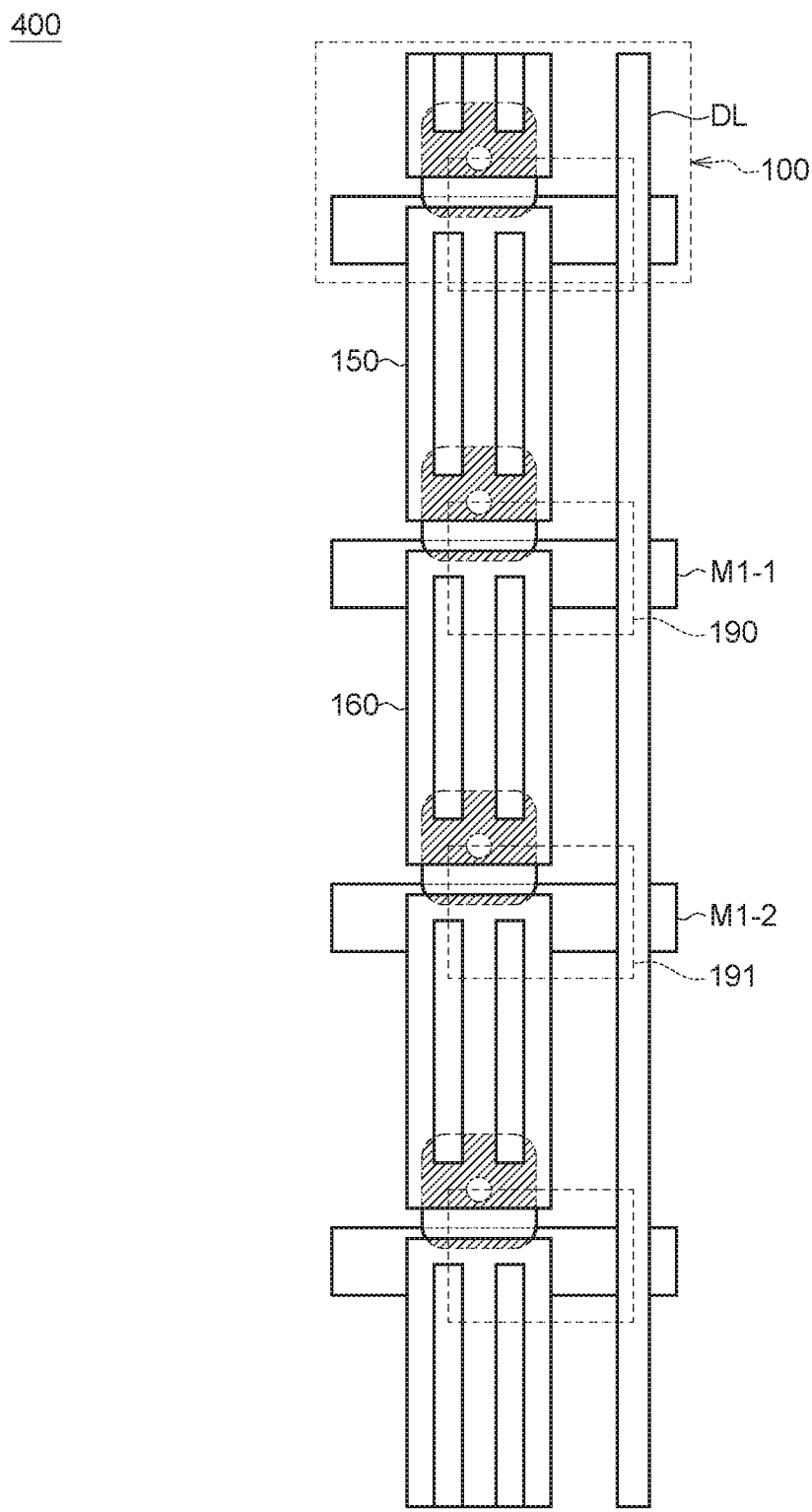
FIG. 4 shows a top view of a display panel according to a still further embodiment of the present disclosure.

FIG. 4 shows a top view of a display panel 400 according to a still further embodiment of the present disclosure. The elements in the present embodiment sharing the same or similar labels with those in the previous embodiments are the same or similar elements, and the description of which is aforementioned.

As shown in FIG. 4, the display panel 400 may further include a first transistor element 190, a first scan line M1-1, a second transistor element 191, and a second scan line M1-2. Referring to FIGS. 1A-1B and 4, the first transistor element 190, the first scan line M1-1, the second transistor element 191, and the second scan line M1-2 are located on the first substrate 110. The first transistor element 190 is controlled by the first scan line M1-1, and the first transistor element 190 is electrically connected to the first pixel electrode 150. The second transistor element 191 is controlled by the second scan line M1-2, and the second transistor element 191 is electrically connected to the second pixel electrode 160. The second scan line M1-2 is adjacent to the first scan line M1-1, and the first insulating layer 120 covers the first transistor element 190 and the second transistor element 191.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a first substrate;
   a first transistor element and a first scan line both located on the first substrate, wherein the first transistor element is controlled by the first scan line;
   a first insulating layer located on the first substrate;
   a common electrode located on the first insulating layer, the common electrode having a first through hole, wherein the first through hole and the first scan line are partially overlapped;
   a second insulating layer located on the common electrode, the second insulating layer covering the common electrode and partially covering the first through hole;
   a first pixel electrode located on the second insulating layer, wherein the first pixel electrode has a slit, the slit and the first through hole are partially overlapped, the first pixel electrode penetrates through the first through hole to electrically connect to the first transistor element;
      wherein the first through hole comprises a first boundary and a second boundary opposite to the first boundary, the first boundary overlaps the first pixel electrode, the second boundary does not overlap the first pixel electrode, the slit extends over the first boundary by a first length, and the first pixel electrode separates from the second boundary by a second length, wherein the second length is greater than the first length.

2. The display panel according to claim 1, further comprising:
   a second pixel electrode located on the second insulating layer, wherein the second pixel electrode is adjacent to the first pixel electrode, an overlapping area of the first scan line and the first pixel electrode is different from an overlapping area of the first scan line and the second pixel electrode.

3. The display panel according to claim 1, further comprising:
   a second pixel electrode located on the second insulating layer, wherein the second pixel electrode is adjacent to the first pixel electrode, a part of the first scan line is disposed between the first pixel electrode and the second pixel electrode.

4. The display panel according to claim 1, further comprising:
   a second pixel electrode located on the second insulating layer, wherein the second pixel electrode is adjacent to the first pixel electrode and overlaps a portion of the first through hole.

5. The display panel according to claim 4, wherein the first pixel electrode and the second pixel electrode are separated by a first distance, the second pixel electrode extends toward the first through hole by a second distance, and the first distance is larger than the second distance.

6. The display panel according to claim 5, wherein the first distance is 2.0-5.0 μm.

7. The display panel according to claim 5, wherein the second distance is 0.1-1.0 μm.

8. The display panel according to claim 4, wherein the second pixel electrode includes a slit, the slit of the second pixel electrode and the first through hole are separated by a third distance, the second pixel electrode extends toward the first through hole by a second distance, and the third distance is larger than the second distance.

9. The display panel according to claim 8, wherein the third distance is 2.0-5.0 μm.

10. The display panel according to claim 4, wherein a first area defined by an overlapping area of the first pixel electrode and the first through hole is larger than a second area defined by an overlapping area of the second pixel electrode and the first through hole.

11. The display panel according to claim 4, wherein the first scan line overlaps with a portion of the second pixel electrode.

12. The display panel according to claim 4, further comprising:
   a second transistor element and a second scan line located on the first substrate, wherein the second transistor element is controlled by the second scan line, and the second transistor element is electrically connected to the second pixel electrode.

13. The display panel according to claim 1, wherein the second insulating layer has a second through hole, and the second through hole is located within the first through hole, and a projection of the second through hole on the first substrate is smaller than a projection of the first through hole on the first substrate.

14. The display panel according to claim 13, further comprising:
   a metal layer, wherein the first pixel electrode is electrically connected to the metal layer through the second through hole.

15. The display panel according to claim 14, further comprising:
   a data line, wherein the metal layer is electrically connected to the data line.

16. The display panel according to claim 1, further comprising:
   a second substrate; and
   a liquid crystal layer located between the first substrate and the second substrate.

\* \* \* \* \*